United States Patent
Lv et al.

(10) Patent No.: US 11,735,360 B2
(45) Date of Patent: Aug. 22, 2023

(54) SANDWICH-STRUCTURED DIELECTRIC MATERIALS FOR PULSE ENERGY STORAGE AS WELL AS PREPARATION METHOD AND APPLICATION THEREOF

(71) Applicant: South China University of Technology, Guangzhou (CN)

(72) Inventors: Ming Lv, Guangzhou (CN); Ruqiang Li, Guangzhou (CN); Yani Wei, Guangzhou (CN); Qiutan Lai, Guangzhou (CN)

(73) Assignee: South China University of Techology, Guangzhou (CN)

( * ) Notice: Subject to any disclaimer, the term of this patent is extended or adjusted under 35 U.S.C. 154(b) by 200 days.

(21) Appl. No.: 17/203,230

(22) Filed: Mar. 16, 2021

(65) Prior Publication Data

US 2021/0296051 A1 Sep. 23, 2021

(30) Foreign Application Priority Data

Mar. 17, 2020 (CN) .......................... 202010185763.3

(51) Int. Cl.
*H01G 4/12* (2006.01)
*C04B 35/634* (2006.01)
(Continued)

(52) U.S. Cl.
CPC ....... *H01G 4/1227* (2013.01); *C03C 10/0018* (2013.01); *C03C 12/00* (2013.01); *C04B 35/465* (2013.01); *C04B 35/468* (2013.01); *C04B 35/4682* (2013.01); *C04B 35/63444* (2013.01); *C04B 41/4539* (2013.01); *C04B 41/5023* (2013.01); *H01G 4/129* (2013.01)

(58) Field of Classification Search
CPC .......... H01G 4/1227; H01G 4/30; H01G 4/33; C03C 10/0018; C03C 12/00; C04B 35/465; C04B 35/468; C04B 35/4682; C04B 35/63444; C04B 2111/00844; C04B 2235/3213; C01G 23/006
See application file for complete search history.

(56) References Cited

PUBLICATIONS

Jones, John G., et al. "Tunable stoichiometry of SiO x-BaTiO y-BO z fabricated by multitarget pulsed laser deposition." Journal of Nanophotonics 9.1 (2015): 093590-093590. (Year: 2015).*

* cited by examiner

*Primary Examiner* — Karl E Group
*Assistant Examiner* — Cameron K Miller
(74) *Attorney, Agent, or Firm* — Gerald E. Hespos; Michael J. Porco

(57) ABSTRACT

A sandwich-structured dielectric material for pulse energy storage is provided as well as a preparation method thereof. Employing a sandwich structure and combining the properties of ceramic-glass materials prepares a high performance dielectric material for pulse energy storage, in which the ceramic dielectric is core-shell structured powder of $Ba_xSr_{1-x}TiO_3$ coated with $SiO_2$, and the glass material is alkali-free glass AF45, of which the chemical composition is 63% $SiO_2$-12% BaO-16% $B_2O_3$-9% $Al_2O_3$. AF45 alkali-free glass paste is spin-coated on both sides of the ceramic and calcined to get a layer-structured material of glass-ceramic-glass.

14 Claims, 1 Drawing Sheet

(51) Int. Cl.
*C04B 35/468* (2006.01)
*C04B 41/45* (2006.01)
*C04B 41/50* (2006.01)
*C03C 10/00* (2006.01)
*C03C 12/00* (2006.01)
*C04B 35/465* (2006.01)

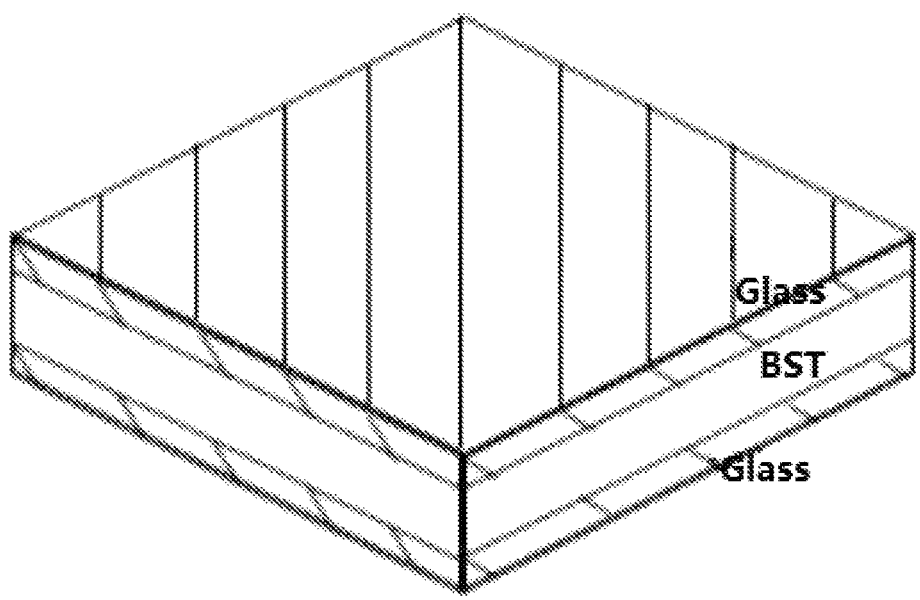

SANDWICH-STRUCTURED DIELECTRIC MATERIALS FOR PULSE ENERGY STORAGE AS WELL AS PREPARATION METHOD AND APPLICATION THEREOF

TECHNICAL FIELD

The present disclosure belongs to the field of ceramics for pulse energy storage, and specifically relates to a sandwich-structured dielectric material for pulse energy storage as well as a preparation method and an application thereof.

BACKGROUND

High-energy storage density dielectrics have high energy density and high efficiency density, which can be used in the development of capacitors of high capacitance and have tremendous application potential in pulse efficiency technology, efficiency electronic circuit, electric vehicles and grid efficiency adjustment. Compared with batteries and other energy storage devices, ceramic capacitors have advantages of fast charging and discharging and high thermal stability. However, at present, most of the existing lead-free ceramic dielectric materials for energy storage have disadvantages of not high enough breakdown strength or lower intensity of polarization, causing low energy storage density, which is difficult to meet the demands of constantly evolving new technology. In general, the energy storage density of a material means the amount of electrical energy contained in the material per unit volume, the unit of which currently in common international use is $J/cm^3$, and the energy storage density can be calculated following the formula: $J=\int_0^P \varepsilon E\, dP$, in which J is the energy storage density, E is the breakdown strength, P is the intensity of polarization, and c is dielectric constant. As known from the above formula, in order to obtain a higher energy storage density, it is an effective way to improve the breakdown strength and relative dielectric constant of ceramic dielectric materials.

Barium titanate has attracted much attention because of its high dielectric constant. However, the dielectric loss of barium titanate ceramic materials is higher at high frequencies, and the high dielectric loss and poor breakdown performance make it difficult for the components prepared to meet the requirements of pulse energy storage capacitors in practical applications. Strontium titanate has a cubic structure at room temperature and exhibits paraelectric phase, of which the dielectric loss is small, the compressive strength is high, and the frequency stability is excellent, so it has become one of the most widely studied and the most attractive lead-free ceramic dielectric systems for energy storage. However, the dielectric constant of strontium titanate ceramics is small, which is about 300 at room temperature. Therefore, it is necessary to perform modification researches so as to expand the application of ceramic dielectrics in the field of energy storage.

At present, the breakdown strength, the energy storage density and the energy storage efficiency of lead-free ceramic dielectric materials for energy storage have yet to be improved.

SUMMARY

To overcome the defects and disadvantages of the existing technologies, a primary purpose of the present disclosure is to provide a method of preparing a sandwich-structured dielectric material for pulse energy storage. By means of designing a sandwich structure and combining the properties of ceramic materials and glass materials, the dielectric materials are allowed to have excellent breakdown strength, energy storage density and energy efficiency. The breakdown strength can reach over 400 kV/cm, the energy storage density can reach 3.0 $J/cm^3$, and the energy efficiency can be up to 86%, meanwhile the spin coating process used in the preparation is complete, the required raw materials are cheap, thus having the advantages of both high performance and simple process.

Another purpose of the present disclosure is to provide a sandwich-structured dielectric material for pulse energy storage prepared by the above method.

A further purpose of the present disclosure is to provide an application of the sandwich-structured dielectric material for pulse energy storage.

The purposes of the present disclosure are achieved by the following technical schemes:

A method of preparing a sandwich-structured dielectric material for pulse energy storage in accordance with one embodiment of this disclosure includes the following steps:

(1) dispersing $Ba_xSr_{1-x}TiO_3$ powder in ethyl alcohol, adding glacial acetic acid and polyvinylpyrrolidone (PVP), mixing uniformly, then adding ethyl orthosilicate to adjust pH, reacting at 30-60° C. with stirring for 12-24 hours, getting a suspension, which is filtered and dried to get BST@$SiO_2$ powder;

wherein x represents the molar fraction of Ba, $0.2 \leq x \leq 0.6$, the expression BST@$SiO_2$ refers to a core-shell structure where BST refers to the core and $SiO_2$ is coated on the outside of the BST core;

(2) mixing the BST@$SiO_2$ powder with a binder uniformly, molding at 150-200 MPa, discharging, and finally calcining at 1100-1200° C. to get ceramic blocks;

(3) mixing $SiO_2$, $BaCO_3$, $B_2O_3$ and $Al_2O_3$, ball-milling uniformly, then sieving, drying, melting at 1400-1500° C. for 2-4 hours, quenching, to get frits; adding water into the frits and then ball-milling and drying again, to get AF45 glass; wherein the chemical composition of the AF45 glass in molar contents is 63% $SiO_2$-12% BaO-16% $B_2O_3$-9% $Al_2O_3$;

(4) adding the AF45 glass and carboxymethyl cellulose into water, to get AF45 glass paste, which is spin-coated onto both sides of ceramic blocks, dried and then calcined, to get a sandwich-structured material of glass-ceramic-glass.

In one embodiment, the $Ba_xSr_{1-x}TiO_3$ powder in step (1) is prepared by the method below:

mixing $BaCO_3$, $SrCO_3$ and $TiO_2$ uniformly at a molar ratio of x:(1−x):1, adding NaCl and mixing uniformly, and ball-milling, sieving, drying, then calcining at 1000-1200° C. for 2-4 hours, filtering and drying to get $Ba_xSr_{1-x}TiO_3$ powder; wherein the weight of NaCl is 5-15 times the total weight of $BaCO_3$, $SrCO_3$ and $TiO_2$.

Absolute ethyl alcohol is used as the medium for ball-milling in one embodiment of the disclosure, and the adding amount of the absolute ethyl alcohol in this embodiment is 1-2 times the total weight of $BaCO_3$, $SrCO_3$ and $TiO_2$.

The filtering in accordance with one aspect of the disclosure includes filtering with deionized water. In this aspect of the disclosure, the ball-milling conditions are: ball-milling at 400-500 r/min for 4-8 hours; the sieving mesh count is 100-200 meshes; and the drying conditions are: drying at 80-100° C. for 12-24 hours.

In one embodiment of the method, the weight of ethyl alcohol in step (1) is 100-200 times that of $Ba_xSr_{1-x}TiO_3$ powder; the weight of glacial acetic acid is 4-6 times that of $Ba_xSr_{1-x}TiO_3$ powder; the weight of polyvinylpyrrolidone is 50-100% that of $Ba_xSr_{1-x}TiO_3$ powder; and the weight of ethyl orthosilicate is 2-8% that of $Ba_xSr_{1-x}TiO_3$ powder.

The adjustment of pH in step (1) may include adjusting the pH of the system to 9-11 with aqueous ammonia.

In one aspect of the disclosure the filtering in step (1) includes filtering with deionized water and ethyl alcohol; and the drying conditions are: drying at 80-100° C. for 12-24 hours.

The BST@SiO$_2$ powder in step (1) is core-shell structured powder of $Ba_xSr_{1-x}TiO_3$ coated with $SiO_2$.

In one aspect of the disclosure, the binder in step (2) is polyvinyl alcohol (PVA); and the weight of the binder is 1-3% that of the BST@SiO$_2$ powder.

The discharging conditions in step (2) may include holding at 500-600° C. for 4-8 hours.

The time for calcination in step (2) in one aspect of the disclosure is 2-4 hours.

In one embodiment of the method, the conditions for uniform ball-milling of $SiO_2$, $BaCO_3$, $B_2O_3$ and $Al_2O_3$ in step (3) are: using absolute ethyl alcohol as the medium, and ball-milling at 400-500 r/min for 4-8 hours, in which the weight of the absolute ethyl alcohol is 1-2 times the total weight of $SiO_2$, $BaCO_3$, $B_2O_3$ and $Al_2O_3$.

The conditions for ball-milling again after adding water into the frits in step (3) may be: ball-milling at 400-500 r/min for 4-8 hours.

The sieving mesh count in step (3) in one embodiment of the disclosure is 100-200 meshes.

The drying conditions in step (3) may include drying at 80-100° C. for 12-24 hours.

The weight of the carboxymethyl cellulose (CMC) in step (4) in one embodiment of the disclosure is 1-2% that of the AF45 glass.

The density of the AF45 glass paste in step (4) may be 1-1.5 g/cm$^3$.

In one embodiment of the method, the spin-coating conditions in step (4) are: the rotation rate is 100-200 rpm, and the duration time is 10-30 s.

The drying conditions in step (4) may include: drying at 80-100° C. for 12-24 hours.

The conditions for calcination in step (4) in one embodiment of the method include: calcination at 800-1000° C. for 10-30 min.

The disclosure also relates to a sandwich-structured dielectric material for pulse energy storage prepared by the above method, where the chemical formula of the ceramic dielectric is $Ba_xSr_{1-x}TiO_3$, in which x is the molar fraction of Ba, and $0.2 \leq x \leq 0.6$.

The sandwich-structured dielectric material for pulse energy storage in accordance with one embodiment is configured so that the breakdown strength is above 420 kV/cm, the discharge energy density reaches over 2.50 J/cm$^3$, and the energy storage efficiency can reach over 85%.

An application of the above sandwich-structured dielectric material for pulse energy storage also is provided.

Compared with the prior art, the present disclosure has the following advantages and beneficial effects:

In the present disclosure, by means of designing a sandwich structure and combining the properties of ceramic materials and glass materials, the glass paste is spin-coated on ceramic blocks and subjected to heat treatment to get a sandwich-structured dielectric material for pulse energy storage with high energy density and energy efficiency. The sandwich-structured dielectric material for pulse energy storage with high energy density and energy efficiency of the present disclosure can be prepared by a simple process, has excellent properties and good stability, of which the breakdown strength is above 420 kV/cm, the discharge energy density can reach 3.00 J/cm$^3$, and the energy storage efficiency can reach over 86%, thus meeting requirements of different applications; there is no lead and no pollution, low cost is involved, the technical process is mature, and being suitable for industrial production.

BRIEF DESCRIPTION OF THE DRAWINGS

FIG. 1 is a diagrammatic sketch showing the sandwich-structured dielectric material for pulse energy storage according to the examples of the present disclosure.

DETAILED DESCRIPTION

The present disclosure will be further described in detail in combination with the following examples and the attached drawing, but the implementation of the present disclosure is not limited to these.

If no specific conditions are indicated in the examples of the present disclosure, conventional conditions or the conditions recommended by the manufacturer should be followed. The used raw materials, reagents and the like of which the manufacturers are not specified are conventional commercial available products.

Example 1

The dielectric material in this example has a chemical formula of AF45/$Ba_xSr_{1-x}TiO_3$/AF45, in which x represents the molar fraction of Ba, and x=0.20.

(1) Preparation of BST powder: By means of a molten salt method, analytical pure $BaCO_3$, $SrCO_3$ and $TiO_2$ were formulated following the chemical formula of BST and mixed uniformly, into which was added NaCl (the adding amount is 5 times the total weight of $BaCO_3$, $SrCO_3$ and $TiO_2$), and ball-milled at a rate of 400 r/min for 4 hours with absolute ethyl alcohol (the adding amount is 1 time the total weight of $BaCO_3$, $SrCO_3$ and $TiO_2$) as the medium, and the paste was sieved over 100 meshes, and dried at 80° C. for 12 hours, then placed in a corundum crucible and calcined at 1000° C. for 2 hours, the resulting powder was filtered with deionized water, and dried at 80° C. for 12 hours to get pure BST ($Ba_xSr_{1-x}TiO_3$) powder.

(2) Preparation of BST@SiO$_2$ powder: the $Ba_xSr_{1-x}TiO_3$ powder obtained from (1) was dissolved in ethyl alcohol (the weight of ethyl alcohol is 100 times that of $Ba_xSr_{1-x}TiO_3$ powder), dispersed by ultrasonic treatment and then added with glacial acetic acid (the weight of glacial acetic acid is 4 times that of $Ba_xSr_{1-x}TiO_3$ powder) and polyvinylpyrrolidone (the weight of PVP is 50% that of $Ba_xSr_{1-x}TiO_3$ powder), stirred and dispersed uniformly by ultrasonic treatment, then added with ethyl orthosilicate (the weight of ethyl orthosilicate is 2% that of $Ba_xSr_{1-x}TiO_3$ powder), adjusted to pH=9 with aqueous ammonia, and finally stirred gently in a 30° C. water bath stirring kettle for 12 hours. The obtained suspension was then filtered with deionized water and ethyl alcohol, and dried at 90° C. for 12 hours to get BST@SiO$_2$ powder.

Into the dried BST@SiO$_2$ powder was added a binder PVA (the weight of PVA is 1% that of $Ba_xSr_{1-x}TiO_3$ powder) for granulation, molded at a pressure of 150 MPa, hold at 500° C. for 4 hours for discharging, and finally hold at 1100° C. for 2 hours to get ceramic blocks.

(3) AF45 glass materials were prepared as below: By means of a frit method, raw materials with molar percentages of 63% $SiO_2$-12% BaO-16% $B_2O_3$-9% $Al_2O_3$ were ball-milled at a rate of 400 r/min for 4 hours with absolute ethyl alcohol (the weight of absolute ethyl alcohol is 1 time the total weight of $SiO_2$, $BaCO_3$, $B_2O_3$ and $Al_2O_3$) as the medium, and the paste was sieved over 100 meshes, dried at 80° C. for 12 hours, and then placed in a corundum crucible and calcined in a muffle furnace at 1400° C. for 2 hours; after quenching, the glass frits were ball-milled at 400 r/min for 4 hours, and dried at 80° C. for 16 hours to get the glass powder.

(4) Into the glass powder were added deionized water and carboxymethyl cellulose (the weight of carboxymethyl cellulose is 1% that of the AF45 glass) to formulate glass paste with a density of 1 g/cm3 and stirred with a rotation rate of 100 rpm for 10 s, spin-coated on both sides of the ceramic blocks uniformly, then heat treated in a muffle furnace at a temperature of 800° C. and hold for 10 min, to get the dielectric material $AF45/Ba_xSr_{1-x}TiO_3/AF45$.

(5) Two surfaces of the calcined samples were polished to clean and plated with gold electrodes, their ferroelectric properties were then tested at room temperature and at a frequency of 10 Hz, and the charge energy density, the discharge energy density and the energy storage efficiency were calculated according to the energy storage properties.

The sandwich-structured dielectric material obtained in this example has an breakdown strength of 425 kV/cm, a charge energy density of 3.12 $J/cm^3$, a discharge energy density of 2.79 $J/cm^3$, and an energy storage efficiency of 87%.

The diagrammatic sketch of the sandwich-structured dielectric material for pulse energy storage in this example with high energy density and energy efficiency is shown in FIG. 1.

Example 2

The dielectric material in this example has a chemical formula of $AF45/Ba_xSr_{1-x}TiO_3/AF45$, in which x represents the molar fraction of Ba, and x=0.30.

(1) Preparation of BST powder: By means of a molten salt method, analytical pure $BaCO_3$, $SrCO_3$ and $TiO_2$ were formulated following the chemical formula of BST and mixed uniformly, into which was added NaCl (the adding amount is 15 times the total weight of $BaCO_3$, $SrCO_3$ and $TiO_2$), and ball-milled at 500 r/min for 8 hours with absolute ethyl alcohol (the adding amount is 2 times the total weight of $BaCO_3$, $SrCO_3$ and $TiO_2$) as the medium, and the paste was sieved over 200 meshes, and dried at 100° C. for 24 hours, then placed in a corundum crucible and calcined at 1200° C. for 4 hours, the resulting powder was filtered with deionized water, and dried at 90° C. for 24 hours to get pure BST ($Ba_xSr_{1-x}TiO_3$) powder.

(2) Preparation of BST@$SiO_2$ powder: the $Ba_xSr_{1-x}TiO_3$ powder obtained from (1) was dissolved in ethyl alcohol (the weight of ethyl alcohol is 200 times that of $Ba_xSr_{1-x}TiO_3$ powder), dispersed by ultrasonic treatment and then added with glacial acetic acid (the weight of glacial acetic acid is 6 times that of $Ba_xSr_{1-x}TiO_3$ powder) and polyvinylpyrrolidone (the weight of PVP is 100% that of $Ba_xSr_{1-x}TiO_3$ powder), stirred and dispersed uniformly by ultrasonic treatment, then added with ethyl orthosilicate (the weight of ethyl orthosilicate is 8% that of $Ba_xSr_{1-x}TiO_3$ powder), adjusted to pH=11 with aqueous ammonia, and finally stirred gently in a 60° C. water bath stirring kettle for 24 hours. The obtained suspension was then filtered with deionized water and ethyl alcohol, and dried at 80° C. for 12 hours to get BST@$SiO_2$ powder.

Into the dried BST@$SiO_2$ powder was added a binder PVA (the weight of PVA is 3% that of $Ba_xSr_{1-x}TiO_3$ powder) for granulation, molded at a pressure of 200 MPa, hold at 600° C. for 8 hours for discharging, and finally hold at 1200° C. for 2 hours to get ceramic blocks.

(3) AF45 glass materials were prepared as below: By means of a frit method, raw materials with molar percentages of 63% $SiO_2$-12% BaO-16% $B_2O_3$-9% $Al_2O_3$ were ball-milled at 500 r/min for 8 hours with absolute ethyl alcohol (the weight of absolute ethyl alcohol is 1.5 times the total weight of $SiO_2$, $BaCO_3$, $B_2O_3$ and $Al_2O_3$) as the medium, and the paste was sieved over 200 meshes, dried at 100° C. for 24 hours, and then placed in a corundum crucible and calcined in a muffle furnace at 1500° C. for 4 hours; after quenching, the glass frits were ball-milled at 500 r/min for 8 hours, and dried at 100° C. for 24 hours to get the glass powder.

(4) Into the glass powder were added deionized water and carboxymethyl cellulose (the weight of carboxymethyl cellulose is 1% that of the AF45 glass) to formulate glass paste with a density of 1.5 g/cm3 and stirred with a rotation rate of 200 rpm for 30 s, spin-coated on both sides of the ceramic blocks uniformly, then heat treated in a muffle furnace at a temperature of 1000° C. and hold for 30 min, to get the dielectric material $AF45/Ba_xSr_{1-x}TiO_3/AF45$.

(5) Two surfaces of the calcined samples were polished to clean and plated with gold electrodes, their ferroelectric properties were then tested at room temperature and at a frequency of 10 Hz, and the charge energy density, the discharge energy density and the energy storage efficiency were calculated according to the energy storage properties.

The sandwich-structured dielectric material obtained in this example has an breakdown strength of 435 kV/cm, a charge energy density of 3.00 $J/cm^3$, a discharge energy density of 2.73 $J/cm^3$, and an energy storage efficiency of 88%.

The diagrammatic sketch of the sandwich-structured dielectric material for pulse energy storage in this example with high energy density and energy efficiency is shown in FIG. 1.

Example 3

The dielectric material in this example has a chemical formula of $AF45/Ba_xSr_{1-x}TiO_3/AF45$, in which x represents the molar fraction of Ba, and x=0.60.

(1) Preparation of BST powder: By means of a molten salt method, analytical pure $BaCO_3$, $SrCO_3$ and $TiO_2$ were formulated following the chemical formula of BST and mixed uniformly, into which was added NaCl (the adding amount is 9 times the total weight of $BaCO_3$, $SrCO_3$ and $TiO_2$), and ball-milled at 450 r/min for 5 hours with absolute ethyl alcohol (the adding amount is 1.5 times the total weight of $BaCO_3$, $SrCO_3$ and $TiO_2$) as the medium, and the paste was sieved over 150 meshes, and dried at 85° C. for 20 hours, then placed in a corundum crucible and calcined at 1120° C. for 3 hours, the resulting powder was filtered with deionized water, and dried at 85° C. for 18 hours to get pure BST ($Ba_xSr_{1-x}TiO_3$) powder.

(2) Preparation of BST@$SiO_2$ powder: the $Ba_xSr_{1-x}TiO_3$ powder obtained from (1) was dissolved in ethyl alcohol (the weight of ethyl alcohol is 150 times that of $Ba_xSr_{1-x}TiO_3$ powder), dispersed by ultrasonic treatment and then added with glacial acetic acid (the weight of glacial acetic acid is 5 times that of $Ba_xSr_{1-x}TiO_3$ powder) and polyvinylpyrrolidone (the weight of PVP is 75% that of $Ba_xSr_{1-x}TiO_3$ powder), stirred and dispersed uniformly by ultrasonic treatment, then added with ethyl orthosilicate (the weight of ethyl orthosilicate is 6% that of $Ba_xSr_{1-x}TiO_3$ powder), adjusted to pH=9.5 with aqueous ammonia, and finally stirred gently in a 45° C. water bath stirring kettle for 20 hours. The obtained suspension was then filtered with deionized water and ethyl alcohol, and dried at 100° C. for 18 hours to get $BST@SiO_2$ powder.

Into the dried $BST@SiO_2$ powder was added a binder PVA (the weight of PVA is 1.5% that of $Ba_xSr_{1-x}TiO_3$ powder) for granulation, molded at a pressure of 150 MPa, hold at 550° C. for 6 hours for discharging, and finally hold at 1120° C. for 3 hours to get ceramic blocks.

(3) AF45 glass materials were prepared as below: By means of a frit method, raw materials with molar percentages of 63% $SiO_2$-12% BaO-16% $B_2O_3$-9% $Al_2O_3$ were ball-milled at 450 r/min for 5 hours with absolute ethyl alcohol (the weight of absolute ethyl alcohol is 1.5 times the total weight of $SiO_2$, $BaCO_3$, $B_2O_3$ and $Al_2O_3$) as the medium, and the paste was sieved over 150 meshes, dried at 85° C. for 20 hours, and then placed in a corundum crucible and calcined in a muffle furnace at 1450° C. for 3 hours; after quenching, the glass frits were ball-milled at 450 r/min for 6 hours, and dried at 85° C. for 14 hours, ready for use.

(4) Into the glass powder were added deionized water and carboxymethyl cellulose (the weight of carboxymethyl cellulose is 1% that of the AF45 glass) to formulate glass paste with a density of 1.2 g/cm3 and stirred with a rotation rate of 160 rpm for 15 s, spin-coated on both sides of the ceramic blocks uniformly, then heat treated in a muffle furnace at a temperature of 920° C. and hold for 15 min, to get the dielectric material $AF45/Ba_xSr_{1-x}TiO_3/AF45$.

(5) Two surfaces of the calcined samples were polished to clean and plated with gold electrodes, their ferroelectric properties were then tested at room temperature and at a frequency of 10 Hz, and the charge energy density, the discharge energy density and the energy storage efficiency were calculated according to the energy storage properties.

The sandwich-structured dielectric material obtained in this example has an breakdown strength of 420 kV/cm, a charge energy density of 2.78 $J/cm^3$, a discharge energy density of 2.50 $J/cm^3$, and an energy storage efficiency of 85%.

The diagrammatic sketch of the sandwich-structured dielectric material for pulse energy storage in this example with high energy density and energy efficiency is shown in FIG. 1.

Example 4

The dielectric material in this example has a chemical formula of $AF45/Ba_xSr_{1-x}TiO_3/AF45$, in which x represents the molar fraction of Ba, and x=0.40.

(1) Preparation of BST powder: By means of a molten salt method, analytical pure $BaCO_3$, $SrCO_3$ and $TiO_2$ were formulated following the chemical formula of BST and mixed uniformly, into which was added NaCl (the adding amount is 10 times the total weight of $BaCO_3$, $SrCO_3$ and $TiO_2$), and ball-milled at 500 r/min for 5 hours with absolute ethyl alcohol (the adding amount is 1.6 times the total weight of $BaCO_3$, $SrCO_3$ and $TiO_2$) as the medium, and the paste was sieved over 180 meshes, and dried at 80° C. for 24 hours, then placed in a corundum crucible and calcined at 1050° C. for 2.5 hours, the resulting powder was filtered with deionized water, and dried at 95° C. for 20 hours to get pure BST ($Ba_xSr_{1-x}TiO_3$) powder.

(2) Preparation of $BST@SiO_2$ powder: the $Ba_xSr_{1-x}TiO_3$ powder obtained from (1) was dissolved in ethyl alcohol (the weight of ethyl alcohol is 150 times that of $Ba_xSr_{1-x}TiO_3$ powder), dispersed by ultrasonic treatment and then added with glacial acetic acid (the weight of glacial acetic acid is 5 times that of $Ba_xSr_{1-x}TiO_3$ powder) and polyvinylpyrrolidone (the weight of PVP is 60% that of $Ba_xSr_{1-x}TiO_3$ powder), stirred and dispersed uniformly by ultrasonic treatment, then added with ethyl orthosilicate (the weight of ethyl orthosilicate is 4% that of $Ba_xSr_{1-x}TiO_3$ powder), adjusted to pH=10 with aqueous ammonia, and finally stirred gently in a 45° C. water bath stirring kettle for 18 hours. The obtained suspension was then filtered with deionized water and ethyl alcohol, and dried at 95° C. for 17 hours to get $BST@SiO_2$ powder.

Into the dried $BST@SiO_2$ powder was added a binder PVA (the weight of PVA is 2.5% that of $Ba_xSr_{1-x}TiO_3$ powder) for granulation, molded at a pressure of 200 MPa, hold at 600° C. for 5 hours for discharging, and finally calcined and hold at 1150° C. for 3 hours to get ceramic blocks.

(3) AF45 glass materials were prepared as below: By means of a frit method, raw materials with molar percentages of 63% $SiO_2$-12% BaO-16% $B_2O_3$-9% $Al_2O_3$ were ball-milled at 500 r/min for 5 hours with absolute ethyl alcohol (the weight of absolute ethyl alcohol is 1.4 times the total weight of $SiO_2$, $BaCO_3$, $B_2O_3$ and $Al_2O_3$) as the medium, and the paste was sieved over 180 meshes, dried at 80° C. for 24 hours, and then placed in a corundum crucible and calcined in a muffle furnace at 1480° C. for 2.5 hours; after quenching, the glass frits were ball-milled at 450 r/min for 6 hours, and dried at 95° C. for 20 hours, ready for use.

(4) Into the glass powder were added deionized water and carboxymethyl cellulose (the weight of carboxymethyl cellulose is 1% that of the AF45 glass) to formulate glass paste with a density of 1.2 g/cm3 and stirred with a rotation rate of 180 rpm for 20 s, spin-coated on both sides of the ceramic blocks uniformly, then heat treated in a muffle furnace at a temperature of 900° C. and hold for 15 min, to get the dielectric material $AF45/Ba_xSr_{1-x}TiO_3/AF45$.

(5) Two surfaces of the calcined samples were polished to clean and plated with gold electrodes, their ferroelectric properties were then tested at room temperature and at a frequency of 10 Hz, and the charge energy density, the discharge energy density and the energy storage efficiency were calculated according to the energy storage properties.

The sandwich-structured dielectric material obtained in this example has an breakdown strength of 450 kV/cm, a charge energy density of 3.21 $J/cm^3$, a discharge energy density of 2.83 $J/cm^3$, and an energy storage efficiency of 89%.

The diagrammatic sketch of the sandwich-structured dielectric material for pulse energy storage in this example with high energy density and energy efficiency is shown in FIG. 1.

Comparative Example 1

The dielectric material in this comparative example has a chemical formula of $Ba_xSr_{1-x}TiO_3$, in which x represents the molar fraction of Ba, and x=0.4.

(1) Preparation of BST powder: By means of a molten salt method, analytical pure $BaCO_3$, $SrCO_3$ and $TiO_2$ were formulated following the chemical formula of BST and mixed uniformly, into which was added NaCl (the adding amount is 10 times the total weight of $BaCO_3$, $SrCO_3$ and $TiO_2$), and ball-milled at 500 r/min for 5 hours with absolute ethyl alcohol (the adding amount is 1.6 times the total weight of $BaCO_3$, $SrCO_3$ and $TiO_2$) as the medium, and the paste was sieved over 180 meshes, and dried at 80° C. for 24 hours, then placed in a corundum crucible and calcined at 1050° C. for 2.5 hours, the resulting powder was filtered with deionized water, and dried at 95° C. for 20 hours to get pure BST ($Ba_xSr_{1-x}TiO_3$) powder.

(2) Preparation of BST@$SiO_2$ powder: the $Ba_xSr_{1-x}TiO_3$ powder obtained from (1) was dissolved in ethyl alcohol (the weight of ethyl alcohol is 150 times that of $Ba_xSr_{1-x}TiO_3$ powder), dispersed by ultrasonic treatment and then added with glacial acetic acid (the weight of glacial acetic acid is 5 times that of $Ba_xSr_{1-x}TiO_3$ powder) and polyvinylpyrrolidone (the weight of PVP is 60% that of $Ba_xSr_{1-x}TiO_3$ powder), stirred and dispersed uniformly by ultrasonic treatment, then added with ethyl orthosilicate (the weight of ethyl orthosilicate is 4% that of $Ba_xSr_{1-x}TiO_3$ powder), adjusted to pH=10 with aqueous ammonia, and finally stirred gently in a 45° C. water bath stirring kettle for 18 hours. The obtained suspension was then filtered with deionized water and ethyl alcohol, and dried at 95° C. for 17 hours to get BST@$SiO_2$ powder.

Into the dried BST@$SiO_2$ powder was added a binder PVA (the weight of PVA is 2.5% that of $Ba_xSr_{1-x}TiO_3$ powder) for granulation, molded at a pressure of 200 MPa, hold at 600° C. for 5 hours for discharging, and finally hold at 1150° C. for 3 hours to get ceramic blocks.

(3) Two surfaces of the calcined samples were polished to clean and plated with gold electrodes, their ferroelectric properties were then tested at room temperature and at a frequency of 10 Hz, and the charge energy density, the discharge energy density and the energy storage efficiency were calculated according to the energy storage properties.

The sandwich-structured dielectric material obtained in this example has an breakdown strength of 320 kV/cm, a charge energy density of 2.10 $J/cm^3$, a discharge energy density of 2.32 $J/cm^3$, and an energy storage efficiency of 81%.

Comparative Example 2

The dielectric material in this comparative example has a chemical formula of $Ba_xSr_{1-x}TiO_3$, in which x represents the molar fraction of Ba, and x=0.4.

(1) Preparation of BST powder: By means of a molten salt method, analytical pure $BaCO_3$, $SrCO_3$ and $TiO_2$ were formulated following the chemical formula of BST and mixed uniformly, into which was added NaCl (the adding amount is 10 times the total weight of $BaCO_3$, $SrCO_3$ and $TiO_2$), and ball-milled at 500 r/min for 5 hours with absolute ethyl alcohol (the adding amount is 1.6 times the total weight of $BaCO_3$, $SrCO_3$ and $TiO_2$) as the medium, and the paste was sieved over 180 meshes, and dried at 80° C. for 24 hours, then placed in a corundum crucible and calcined at 1050° C. for 2.5 hours, the resulting powder was filtered with deionized water, and dried at 95° C. for 20 hours to get pure BST ($Ba_xSr_{1-x}TiO_3$) powder.

(2) Into the dried BST powder was added a binder PVA (the weight of PVA is 2.5% that of $Ba_xSr_{1-x}TiO_3$ powder) for granulation, molded at a pressure of 200 MPa, hold at 600° C. for 5 hours for discharging, and finally hold at 1150° C. for 3 hours to get ceramic blocks.

(3) Two surfaces of the calcined samples were polished to clean and plated with gold electrodes, their ferroelectric properties were then tested at room temperature and at a frequency of 10 Hz, and the charge energy density, the discharge energy density and the energy storage efficiency were calculated according to the energy storage properties.

The sandwich-structured dielectric material obtained in this example has an breakdown strength of 280 kV/cm, a charge energy density of 1.79 $J/cm^3$, a discharge energy density of 1.65 $J/cm^3$, and an energy storage efficiency of 85%.

The above examples are preferable implementation of the present disclosure, but the implementation of the present disclosure is not restricted to the above examples. Any other changes, modifications, substitutions, combinations and simplifications without deviating from the spirit and principle of the present disclosure should be equivalent replacements and all covered within the protection scope of the present disclosure.

What is claimed is:

1. A method of preparing a sandwich-structured dielectric material for pulse energy storage, wherein, comprising the following steps:
    (1) dispersing $Ba_xSr_{1-x}TiO_3$ powder in ethyl alcohol, adding glacial acetic acid and polyvinylpyrrolidone, mixing uniformly, then adding ethyl orthosilicate to adjust pH, reacting at 30-60° C. with stirring for 12-24 hours, getting a suspension, which is filtered and dried to get BST@$SiO_2$ powder;
    wherein x represents the molar fraction of Ba, $0.2 \le x \le 0.6$, and BST@$SiO_2$ identifies a core-shell structure with BST as a core of the core-shell structure and $SiO_2$ as a shell of the core-shell structure;
    (2) mixing the BST@$SiO_2$ powder with a binder uniformly, molding at 150-200 MPa, discharging, and finally calcining at 1100-1200° C. to get ceramic blocks;
    (3) mixing $SiO_2$, $BaCO_3$, $B_2O_3$ and $Al_2O_3$, ball-milling uniformly, then sieving, drying, melting at 1400-1500° C. for 2-4 hours, quenching, to get frits; adding water into the frits and then ball-milling and drying again, to get AF45 glass; wherein the chemical composition of the AF45 glass in molar contents is 63% $SiO_2$-12% BaO-16% $B_2O_3$-9% $Al_2O_3$;
    (4) adding the AF45 glass and carboxymethyl cellulose into water, to get AF45 glass paste, which is spin-coated onto both sides of ceramic blocks, dried and then calcined, to get a sandwich-structured material of glass-ceramic-glass.

2. The method of preparing a sandwich-structured dielectric material for pulse energy storage according to claim 1, wherein, the weight of ethyl alcohol in step (1) is 100-200 times that of $Ba_xSr_{1-x}TiO_3$ powder; the weight of glacial acetic acid is 4-6 times that of $Ba_xSr_{1-x}TiO_3$ powder; the weight of polyvinylpyrrolidone is 50-100% that of $Ba_xSr_{1-x}TiO_3$ powder; and the weight of ethyl orthosilicate is 2-8% that of $Ba_xSr_{1-x}TiO_3$ powder.

3. The method of preparing a sandwich-structured dielectric material for pulse energy storage according to claim 1, wherein, the conditions for calcination in step (4) are: calcination at 800-1000° C. for 10-30 min.

4. The method of preparing a sandwich-structured dielectric material for pulse energy storage according to claim 2, wherein, the conditions for calcination in step (4) are: calcination at 800-1000° C. for 10-30 min.

5. The method of preparing a sandwich-structured dielectric material for pulse energy storage according to claim 1, wherein, the adjustment of pH in step (1) means adjusting the pH to 9-11 with aqueous ammonia; and the time for calcination in step (2) is 2-4 hours.

6. The method of preparing a sandwich-structured dielectric material for pulse energy storage according to claim 2, wherein, the adjustment of pH in step (1) means adjusting the pH to 9-11 with aqueous ammonia; and the time for calcination in step (2) is 2-4 hours.

7. The method of preparing a sandwich-structured dielectric material for pulse energy storage according to claim 1, wherein, the binder in step (2) is PVA; the weight of the binder is 1-3% that of the BST@$SiO_2$ powder; the discharging conditions are: holding at 500-600° C. for 4-8 hours.

8. The method of preparing a sandwich-structured dielectric material for pulse energy storage according to claim 2, wherein, the binder in step (2) is PVA; the weight of the binder is 1-3% that of BST@$SiO_2$ powder; the discharging conditions are: holding at 500-600° C. for 4-8 hours.

9. The method of preparing a sandwich-structured dielectric material for pulse energy storage according to claim 1, wherein, the $Ba_xSr_{1-x}TiO_3$ powder in step (1) is prepared by the method below:

mixing $BaCO_3$, $SrCO_3$ and $TiO_2$ uniformly at a molar ratio of x:(1−x):1, adding NaCl and mixing uniformly, and ball-milling, sieving, drying, then calcining at 1000-1200° C. for 2-4 hours, filtering and drying to get $Ba_xSr_{1-x}TiO_3$ powder; wherein the weight of NaCl is 5-15 times the total weight of $BaCO_3$, $SrCO_3$ and $TiO_2$; absolute ethyl alcohol is used as the medium for ball-milling, wherein the added amount of the absolute ethyl alcohol is 1-2 times the total weight of $BaCO_3$, $SrCO_3$ and $TiO_2$; the ball-milling conditions are: ball-milling at 400-500 r/min for 4-8 hours; and the sieving mesh count is 100-200 meshes.

10. The method of preparing a sandwich-structured dielectric material for pulse energy storage according to claim 2, wherein, the $Ba_xSr_{1-x}TiO_3$ powder in step (1) is prepared by the method below:

mixing $BaCO_3$, $SrCO_3$ and $TiO_2$ uniformly at a molar ratio of x:(1−x):1, adding NaCl and mixing uniformly, and ball-milling, sieving, drying, then calcining at 1000-1200° C. for 2-4 hours, filtering and drying to get $Ba_xSr_{1-x}TiO_3$ powder; wherein the weight of NaCl is 5-15 times the total weight of $BaCO_3$, $SrCO_3$ and $TiO_2$; absolute ethyl alcohol is used as the medium for ball-milling, wherein the added amount of the absolute ethyl alcohol is 1-2 times the total weight of $BaCO_3$, $SrCO_3$ and $TiO_2$; the ball-milling conditions are: ball-milling at 400-500 r/min for 4-8 hours; and the sieving mesh count is 100-200 meshes.

11. The method of preparing a sandwich-structured dielectric material for pulse energy storage according to claim 1, wherein, the density of AF45 glass in the AF45 glass paste of step (4) is 1-1.5 g/cm³; the spin-coating conditions are: the rotation rate is 100-200 rpm, and the duration time is 10-30 s; the weight of carboxymethyl cellulose is 1-2% that of AF45 glass.

12. The method of preparing a sandwich-structured dielectric material for pulse energy storage according to claim 2, wherein, the density of AF45 glass in the AF45 glass paste of step (4) is 1-1.5 g/cm³; the spin-coating conditions are: the rotation rate is 100-200 rpm, and the duration time is 10-30 s; the weight of carboxymethyl cellulose is 1-2% that of AF45 glass.

13. The method of preparing a sandwich-structured dielectric material for pulse energy storage according to claim 1, wherein, the conditions for uniform ball-milling of $SiO_2$, $BaCO_3$, $B_2O_3$ and $Al_2O_3$ in step (3) are: using absolute ethyl alcohol as the medium, and ball-milling at 400-500 r/min for 4-8 hours, wherein the weight of the absolute ethyl alcohol is 1-2 times the total weight of $SiO_2$, $BaCO_3$, $B_2O_3$ and $Al_2O_3$; the conditions for ball-milling again after adding water into the frits are: ball-milling at 400-500 r/min for 4-8 hours; the sieving mesh count is 100-200 meshes.

14. The method of preparing a sandwich-structured dielectric material for pulse energy storage according to claim 2, wherein, the conditions for uniform ball-milling of $SiO_2$, $BaCO_3$, $B_2O_3$ and $Al_2O_3$ in step (3) are: using absolute ethyl alcohol as the medium, and ball-milling at 400-500 r/min for 4-8 hours, wherein the weight of the absolute ethyl alcohol is 1-2 times the total weight of $SiO_2$, $BaCO_3$, $B_2O_3$ and $Al_2O_3$; the conditions for ball-milling again after adding water into the frits are: ball-milling at 400-500 r/min for 4-8 hours; the sieving mesh count is 100-200 meshes.

\* \* \* \* \*